US010044780B2

(12) United States Patent
Dowlatkhah et al.

(10) Patent No.: US 10,044,780 B2
(45) Date of Patent: Aug. 7, 2018

(54) DYNAMIC SEGREGATED SECURE DATA CONNECTION

(71) Applicants: AT&T INTELLECTUAL PROPERTY I, L.P., Atlanta, GA (US); AT&T Mobility II LLC, Atlanta, GA (US)

(72) Inventors: Sangar Dowlatkhah, Johns Creek, GA (US); Erie Lai Har Lau, Bellevue, WA (US)

(73) Assignees: AT&T INTELLECTUAL PROPERTY I, L.P., Atlanta, GA (US); AT&T MOBILITY II LLC, Bedminster, NJ (US)

( * ) Notice: Subject to any disclaimer, the term of this patent is extended or adjusted under 35 U.S.C. 154(b) by 171 days.

(21) Appl. No.: 14/836,550

(22) Filed: Aug. 26, 2015

(65) Prior Publication Data
US 2017/0063949 A1 Mar. 2, 2017

(51) Int. Cl.
*H04L 12/24* (2006.01)
*H04L 29/06* (2006.01)
*H04W 4/50* (2018.01)

(52) U.S. Cl.
CPC .............. *H04L 65/60* (2013.01); *H04L 63/00* (2013.01); *H04L 69/03* (2013.01); *H04W 4/50* (2018.02)

(58) Field of Classification Search
CPC ......... H04L 65/60; H04L 69/03; H04W 4/001
USPC ........................................................ 709/219
See application file for complete search history.

(56) References Cited

U.S. PATENT DOCUMENTS

| 6,138,156 | A | 10/2000 | Fletcher et al. |
|---|---|---|---|
| 7,581,030 | B2 | 8/2009 | Dowling |
| 7,890,576 | B2 | 2/2011 | Button et al. |
| 8,046,462 | B2 | 10/2011 | Trappeniers et al. |
| 8,360,975 | B1 | 1/2013 | Schwieterman et al. |
| 8,381,081 | B1* | 2/2013 | Subbiah .............. G06F 11/2007 714/754 |
| 8,483,191 | B2 | 7/2013 | Erdman et al. |
| 8,750,123 | B1 | 6/2014 | Alisawi |
| 8,868,661 | B2 | 10/2014 | Asawa et al. |

(Continued)

OTHER PUBLICATIONS

Office Action for U.S. Appl. No. 14/827,028, dated Apr. 5, 2017, 50 pages.

(Continued)

*Primary Examiner* — El Hadji Sall
*Assistant Examiner* — Elizabeth Kassa
(74) *Attorney, Agent, or Firm* — Amin, Turocy & Watson, LLP

(57) ABSTRACT

A system can perform operations including receiving a first data stream from a first device, wherein the first data stream is associated with an active session between the first device and a mobile network and wherein the first data stream is associated with a first incoming port. The system can also receive a second data stream from the first device, wherein the second data stream is associated with the active session, and wherein the second data stream is associated with a second incoming port. The system can also determine a third port and a fourth port that are outgoing ports that respectively correspond to the first and second ports. The system can also transmit the first data stream to a second device via the third port and transmit the second data stream to a third device via the fourth port.

20 Claims, 10 Drawing Sheets

(56) References Cited

U.S. PATENT DOCUMENTS

| | | |
|---|---|---|
| 8,984,282 B1 | 3/2015 | Kragh |
| 9,065,936 B2 | 6/2015 | Goldner et al. |
| 2001/0049790 A1 | 12/2001 | Faccin et al. |
| 2003/0105827 A1 | 6/2003 | Tan et al. |
| 2004/0203648 A1 | 10/2004 | Wong |
| 2006/0031941 A1 | 2/2006 | Xiao et al. |
| 2007/0027715 A1 | 2/2007 | Gropper et al. |
| 2007/0043594 A1 | 2/2007 | Lavergne |
| 2007/0086475 A1* | 4/2007 | Clemens ............ H04L 29/06027 370/458 |
| 2007/0157022 A1 | 7/2007 | Blom et al. |
| 2007/0192140 A1 | 8/2007 | Gropper |
| 2008/0133716 A1 | 6/2008 | Rao et al. |
| 2008/0293411 A1 | 11/2008 | Hinton et al. |
| 2009/0259493 A1* | 10/2009 | Venon .................... G06F 19/322 705/3 |
| 2010/0151841 A1 | 6/2010 | Metcalf et al. |
| 2010/0262545 A1 | 10/2010 | Herlitz |
| 2010/0311402 A1 | 12/2010 | Srinivasan et al. |
| 2010/0311418 A1 | 12/2010 | Shi et al. |
| 2010/0312852 A1 | 12/2010 | Kamga et al. |
| 2010/0332258 A1 | 12/2010 | Dahlke et al. |
| 2011/0021140 A1 | 1/2011 | Binier |
| 2011/0197237 A1* | 8/2011 | Turner ............... H04N 21/2343 725/78 |
| 2011/0225007 A1 | 9/2011 | Theis |
| 2011/0243553 A1 | 10/2011 | Russell |
| 2011/0264460 A1 | 10/2011 | Jagemann et al. |
| 2011/0282688 A1 | 11/2011 | Raggousis |
| 2012/0084092 A1 | 4/2012 | Kozuch et al. |
| 2012/0101847 A1 | 4/2012 | Johnson et al. |
| 2012/0155387 A1 | 6/2012 | Simons et al. |
| 2012/0172089 A1 | 7/2012 | Bae et al. |
| 2012/0277543 A1* | 11/2012 | Homchowdhury .. A61B 5/0022 600/300 |
| 2012/0311657 A1 | 12/2012 | Boldyrev et al. |
| 2012/0314644 A1* | 12/2012 | Lagerman ........... H04W 72/005 370/312 |
| 2012/0323691 A1 | 12/2012 | McLaughlin et al. |
| 2013/0035063 A1 | 2/2013 | Fisk et al. |
| 2013/0090942 A1 | 4/2013 | Robinson et al. |
| 2013/0124523 A1 | 5/2013 | Rogers et al. |
| 2013/0132109 A1 | 5/2013 | Mruthyunjaya et al. |
| 2013/0231948 A1 | 9/2013 | Kim et al. |
| 2013/0290439 A1 | 10/2013 | Blom |
| 2013/0297821 A1 | 11/2013 | Tanenbaum et al. |
| 2013/0304486 A1* | 11/2013 | Jagemann ........... G06Q 30/0603 705/2 |
| 2013/0329552 A1 | 12/2013 | Carnero Ros et al. |
| 2013/0346954 A1 | 12/2013 | Tryon et al. |
| 2014/0004854 A1 | 1/2014 | Veran et al. |
| 2014/0115507 A1 | 4/2014 | Bailey et al. |
| 2014/0122119 A1 | 5/2014 | Hardy |
| 2014/0185521 A1 | 7/2014 | Aksu et al. |
| 2014/0207686 A1 | 7/2014 | Experton |
| 2014/0247716 A1* | 9/2014 | Xiao .................... H04L 65/1016 370/230 |
| 2014/0254491 A1 | 9/2014 | Lindholm |
| 2015/0004967 A1* | 1/2015 | Jiang ...................... H04W 8/06 455/433 |
| 2015/0006723 A1 | 1/2015 | Sheth et al. |
| 2015/0009826 A1 | 1/2015 | Ma et al. |
| 2015/0070516 A1 | 3/2015 | Shoemake et al. |
| 2015/0101066 A1 | 4/2015 | Fram |
| 2015/0172993 A1 | 6/2015 | Jiang |
| 2015/0188843 A1* | 7/2015 | Chauhan ............... H04L 47/801 709/225 |
| 2015/0245241 A1 | 8/2015 | Posz et al. |
| 2015/0296368 A1 | 10/2015 | Kaufman et al. |
| 2015/0309516 A1 | 10/2015 | Williams et al. |
| 2015/0381571 A1 | 12/2015 | Plasse et al. |
| 2016/0006571 A1 | 1/2016 | Teittinen et al. |
| 2016/0029160 A1 | 1/2016 | Theurer et al. |
| 2016/0034713 A1 | 2/2016 | Ramirez |
| 2016/0088461 A1 | 3/2016 | Jiang |
| 2016/0125471 A1 | 5/2016 | Hsu et al. |
| 2016/0127777 A1 | 5/2016 | Roberts et al. |
| 2016/0142878 A1 | 5/2016 | Saulnier |
| 2016/0170991 A1 | 6/2016 | Birchall |
| 2016/0203123 A1 | 7/2016 | Kozloski et al. |
| 2016/0210416 A1 | 7/2016 | Whitehurst |
| 2016/0269891 A1 | 9/2016 | Chen |
| 2016/0275248 A1 | 9/2016 | Kim et al. |
| 2016/0277368 A1 | 9/2016 | Narayanaswamy et al. |
| 2016/0285998 A1 | 9/2016 | Hardy |
| 2016/0295544 A1 | 10/2016 | Jiang |
| 2016/0315902 A1 | 10/2016 | Silva |
| 2016/0342767 A1 | 11/2016 | Narasimhan et al. |
| 2017/0118622 A1 | 4/2017 | Jiang |
| 2017/0134516 A1 | 5/2017 | Gutman |
| 2017/0243028 A1 | 8/2017 | LaFever et al. |

OTHER PUBLICATIONS

Office Action for U.S. Appl. No. 14/821,425, dated Mar. 31, 2017, 18 pages.

Office Action for U.S. Appl. No. 14/821,450, dated May 31, 2017, 22 pages.

Office Action for U.S. Appl. No. 14/821,425 dated Jan. 8, 2018, 21 pages.

Notice of Allowance for U.S. Appl. No. 14/821,450 dated Nov. 28, 2017, 26 pages.

Office Action for U.S. Appl. No. 14/821,425, dated Sep. 7, 2017, 22 pages.

Office Action for U.S. Appl. No. 14/827,028, dated Sep. 1, 2017, 59 pages.

Non-Final Office action dated Mar. 30, 2018 for U.S. Appl. No. 14/827,028, 53 pages.

Office Action dated May 24, 2018 for U.S. Appl. No. 14/929,897, 43 pages.

\* cited by examiner

DYNAMIC SEGREGATED SECURE DATA CONNECTION

TECHNICAL FIELD

The subject disclosure relates to dynamic segregated secure data connections from one device to multiple devices in a wireless communication environment.

BACKGROUND

In order to provide more personalized healthcare to more patients, devices can allow patients to send electronic personal health information to doctors and to monitoring databases. Electronic personal health information is federally regulated, however, and there are strict rules for how mobile applications have to enforce security measures and policy rules at the application layers on the mobile side and at the data storage on the server side. Devices that establish secure data connections with other devices tear down the secure connections before establishing a new connection.

DETAILED DESCRIPTION

Figure 1:
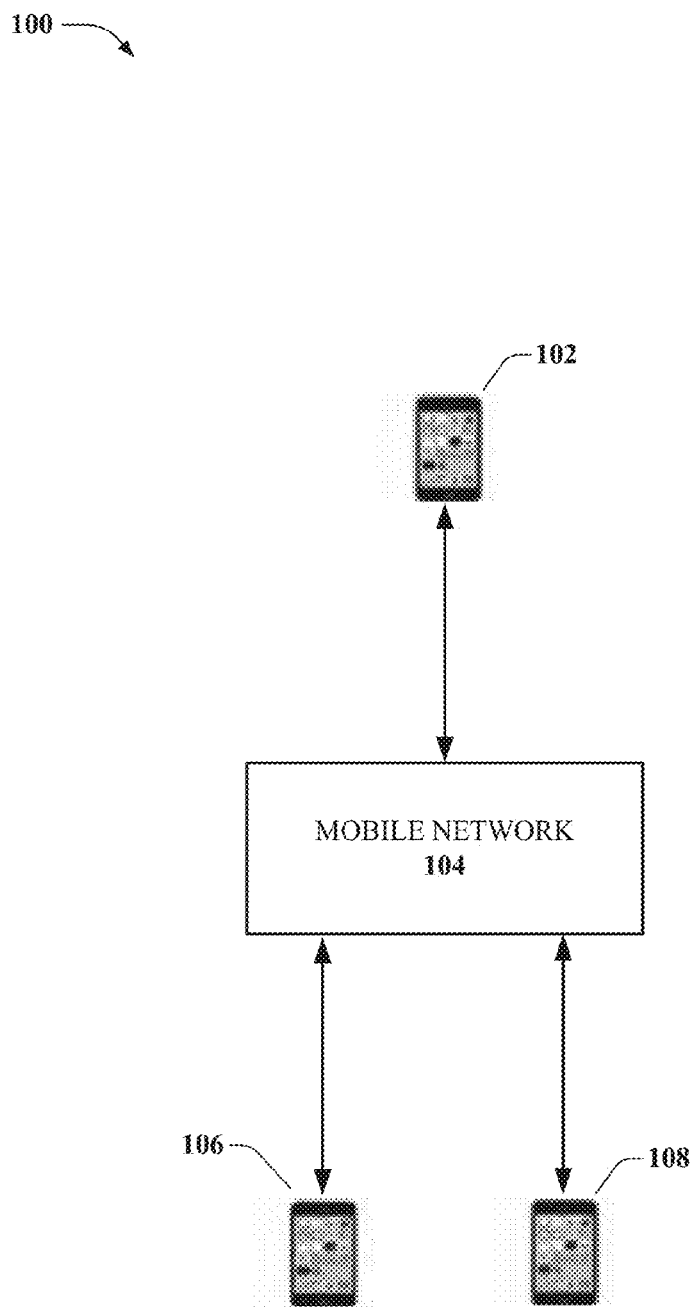
FIG. 1 is an example, non-limiting embodiment of a block diagram showing a network that can support dynamic segregated secure data connections in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In one or more embodiments, a mobile network is provided to dynamic segregated secure connections between various devices and user equipment. The mobile network can enable a user equipment to maintain multiple secure and segregated data connections with other user equipment and cloud services at the same time using the same active session. Point to point communications can be established between the user equipment where each incoming data connection from a user equipment connects to a different port in a multiplexer with a corresponding outgoing port that can connect to a variety of destinations. The multiplexer uses port forwarding to forward the data connections from the incoming ports to the outgoing ports. The receiving destinations can then treat the outgoing ports as the originating data connection.

In an embodiment, a single application on a device can establish secure data connections that are segregated from each other and from other non-secured data connection while engaged in a single active packet data protocol context session with the mobile network. Traditionally, establishing multiple secure data connections would entail serially establishing and de-establishing secure connections. The dynamic segregated secure connection system disclosed herein can use a multiplexer that receives communications directed to incoming ports and uses a predefined port-forwarding scheme to then transmit the secure connections via forwarded ports. The predefined port-forwarding scheme can be based on the type of communication, the content, or the service that is associated with the secure connection.

In an embodiment, the secure connections can be set up via a datagram transport layer security connection (DTLS) that allows datagram-based applications to communicate in a way that is designed to prevent eavesdropping, tampering, or message forgery. The DTLS protocol can be based on the stream-oriented Transport Layer Security (TLS) protocol and is intended to provide similar security guarantees. The DTLS protocol datagram preserves the semantics of the underlying transport (the application does not suffer from the delays associated with stream protocols).

The DTLS connection can include a request to setup a secure connection and can include the port number and information about the multiplexer as a default gateway. Within the secure connection port multiplexer, the incoming port and the outgoing port for that specific connection type can be defined in a configuration file. For example, each incoming secure video session port can be tied to a specific outgoing port. The multiplexer can forward the secure data stream connection request to the predefined outgoing port, which then can be transmitted to the final destination. Once the DTLS signaling is setup, a secure real-time traffic protocol connection (e.g., Web Real-Time Connection "WebRTC") can be initiated from the originating to designated port.

For these considerations as well as other considerations, in one or more embodiments, a system comprises a processor and a memory that stores executable instructions that, when executed by the processor, facilitate performance of operations, comprising receiving a first data stream from a first device, wherein the first data stream is associated with an active session between the first device and a mobile network and wherein the first data stream is associated with a first incoming port. The operations also comprise receiving a second data stream from the first device, wherein the second data stream is associated with the active session, and wherein the second data stream is associated with a second incoming port. The operations also comprise determining a third port and a fourth port that are outgoing ports that respectively correspond to the first and second ports. The operations can also comprise transmitting the first data stream to a second device via the third port and transmitting the second data stream to a third device via the fourth port.

In another embodiment, a method comprises receiving, by a network device comprising a processor, a first data stream and a second data stream from first user equipment, wherein the first data stream and the second data stream are associated with a packet data protocol context and the first data stream is received at a first port of the network device and the second data stream is received at a second port of the network device. The method also comprises determining, by the network device, a third port of the network device and a fourth port of the network device that are outgoing ports that respectively correspond to the first port and the second port. The method also comprises transmitting, by the network device, the first data stream to second user equipment via the third port, and the second data stream to third user equipment via the fourth port.

In another embodiment, a machine-readable storage medium, comprising executable instructions that, when executed by a processor, facilitate performance of operations comprising receiving a first data stream and a second data stream from a first user equipment, wherein the first data stream and the second data stream are associated with a packet data protocol context and the first data stream is received at a first port and the second data stream is received at a second port. The operations also comprise determining a third port and a fourth port that are outgoing ports that respectively correspond to the first port and the second port. The operations further comprise transmitting the first data stream to a second user equipment via the third port, and the second data stream to a third user equipment via the fourth port.

Turning now to FIG. 1, illustrated is an example, non-limiting embodiment of a block diagram 100 showing a network that can support dynamic segregated secure data connections in accordance with various aspects described herein.

A mobile network 104 generally comprises a radio access network that facilitates communications between the mobile devices 102, 106, and 108 and a core network. In the case of Long Term Evolution ("LTE") networks and other 3rd Generation Partnership Project ("3GPP") compliant networks (e.g., LTE Advanced) and non-3GPP systems such as WiMAX and CDMA2000 (these networks are the radio access network and an evolved packet core network that can contain a series of components that provide mobile data and control management). The dynamic secure mobile network system disclosed herein can be utilized in a network that comprises base station devices (eNodeBs) and WiFi access points and other network access points some embodiments, the dynamic secure mobile network system can be operable with user equipment or networked devices that are not directly attached to a mobile network system but rather have wireline networked access. For the sake of simplicity, throughout this application, reference will be made to a mobile network, but the subject matter disclosed herein can be operable in any networked environment.

In an embodiment, mobile network 104 can be in communication with a mobile device or other user equipment 102. In some embodiments, the user equipment 102 can be a mobile device, tablet, laptop, or desktop computer, or any other computing device. An active session that the user equipment 102 has with the mobile network 104 can have one or more data streams depending on which applications are active on the user equipment 102. For instance, an application on user equipment 102 can simultaneously communicate with user equipment 106 and 108 via mobile network 104, while user equipment 102 has a single active session with mobile network 104. In an embodiment, the data streams can be both segregated and secure data connections between each of user equipment 102 and 106 and 102 and 108.

In an embodiment, the content of the data transmitted between the mobile device 102 and the devices 106 and 108 can include private and/or protected information that can comprise electronic personal health information (ePHI) which refers to any protected health information (PHI) that is regulated (e.g., HIPAA). Private information can also comprise proprietary information, national security information, or other information in which it may be desirable to handle separately from non-private information.

In an embodiment, the mobile network 104 can receive a first data stream from user equipment 102 and also receive a second data stream from user equipment 102, where both data streams are received via an active packet data protocol context session between the mobile network 104 and the user equipment 102. Each of the data streams can be directed at specific ports, and a multiplexer in the mobile network 104 can use port forwarding to send the data streams to user equipment 106 and 108 via corresponding ports that can be predefined. In an embodiment, the data streams can come from a single application on the user device 102 and be associated with different services of the application. In other embodiments, the data streams can come from different applications on the device.

In an embodiment, the application on the user equipment 102 can embed port information into the data streams to direct the data streams to incoming ports in the mobile network 104. In other embodiments, mobile network 104 can determine which incoming ports in the mobile network 104 to direct the data streams to based on the content of the data streams or which services the data streams are associated with. In an embodiment, a first data stream can be associated with secure and/or private data originating from a sensor device on the user equipment 102, while the other data stream can be associated with a video session, chat session, or other data transfer connection, real-time or not real-time connection.

In an embodiment, the secure connections can be setup by the mobile network 104 via a datagram transport layer security connection (DTLS) that allows datagram-based applications to communicate in a way that is designed to prevent eavesdropping, tampering, or message forgery. The DTLS protocol can be based on the stream-oriented Transport Layer Security (TLS) protocol and is intended to provide similar security guarantees. The DTLS protocol datagram preserves the semantics of the underlying transport (the application does not suffer from the delays associated with stream protocols).

The DTLS connection can include a request to setup a secure connection and can include the port number and information about the multiplexer as a default gateway. Within the secure connection port multiplexer, the incoming port and the outgoing port for that specific connection type can be defined in a configuration file. For example, each incoming secure video session port can be tied to a specific outgoing port. The multiplexer can forward the secure data stream connection request to the predefined outgoing port, which then can be transmitted to the final destination. Once the DTLS signaling is setup by the mobile network, a secure real-time traffic protocol connection (e.g., Web Real-Time Connection "WebRTC") can be initiated from the originating to designated port.

It is to be appreciated that while reference is made in FIG. 1 to a mobile network, in other embodiments, other networks are possible. For instance, the intermediary network (mobile network 104 in FIG. 1) can be a WIFI network, or another wired or wireless computing network. For instance, mobile network 104 in some embodiments can be an intranet of a hospital or other defined space, and user equipment 102, 106, and 108 can be devices within the hospital capable of real-time communications. It is also to be appreciated that while in FIG. 1, user equipment 102 is described as maintaining two segregated secure realtime connections with user equipment 106 and 108, in other embodiments, user equipment 102 can establish secure communications with one, or three or more devices.

Figure 2:
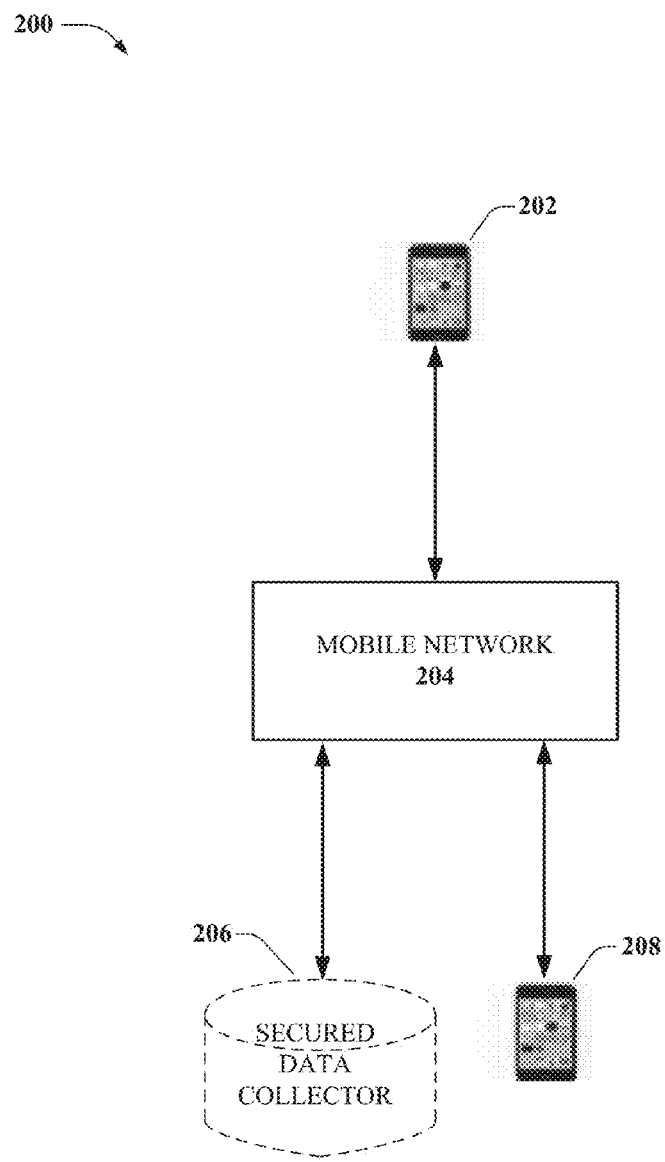
FIG. 2 is an example, non-limiting embodiment of a block diagram showing a network that can support dynamic segregated secure data connections in accordance with various aspects described herein.

Turning now to FIG. 2, illustrated is an example, non-limiting embodiment of a block diagram 200 showing a network that can support dynamic segregated secure data connections in accordance with various aspects described herein.

A mobile network 204 generally comprises a radio access network that facilitates communications between the device 202, 206, and 208. In an embodiment, device 206 can be a database that is a secured data collector 206 that stores private data collected by a sensory device on device 202.

In an embodiment, mobile network 204 can be in communication with a mobile device or other user equipment 202. In some embodiments, the user equipment 202 can be a mobile device, tablet, laptop, or desktop computer, or any other computing device. An active session that the user equipment 202 has with the mobile network 204 can have one or more data streams depending on which applications are active on the user equipment 202. For instance, an application on user equipment 202 can simultaneously communicate with secured data collector 206 and device 208 via mobile network 204, while user equipment 202 has a single active session with mobile network 204. In an embodiment, the data streams can be both segregated and secure data connections between each of device 202 and secured data collector 206 and device 202 and device 208.

In an embodiment, the content of the data transmitted between the mobile device 202 and the secured data collector 206 and 208 can include private and/or protected information that can comprise electronic personal health information (ePHI) which refers to any protected health information (PHI) that is regulated (e.g., HIPAA). Private information can also comprise proprietary information, national security information, or other information in which it may be desirable to handle separately from non-private information.

In an embodiment, the mobile network 204 can receive a first data stream from user equipment 202 and also receive a second data stream from user equipment 202, where both data streams are received via an active packet data protocol context session between the mobile network 204 and the user equipment 202. Each of the data streams can be directed at specific ports, and a multiplexer in the mobile network 204 can use port forwarding to send the data streams to secured data collector 206 and device 208 via corresponding ports that can be predefined. In an embodiment, the data streams can come from a single application on the user device 202 and be associated with different services of the application. In other embodiments, the data streams can come from different applications on the device.

In an embodiment, the application on the user equipment 202 can embed port information into the data streams to direct the data streams to incoming ports in the mobile network 204. In other embodiments, mobile network 204 can determine which incoming ports in the mobile network 204 to direct the data streams to based on the content of the data streams or which services the data streams are associated with. In an embodiment, a first data stream can be associated with secure and/or private data originating from a sensor device on the user equipment 202, while the other data stream can be associated with a video session, chat session, or other data transfer connection, real-time or not real-time connection.

In an embodiment, the secure connections can be setup by the mobile network 204 via a datagram transport layer security connection (DTLS) that allows datagram-based applications to communicate in a way that is designed to prevent eavesdropping, tampering, or message forgery. The DTLS protocol can be based on the stream-oriented Transport Layer Security (TLS) protocol and is intended to provide similar security guarantees. The DTLS protocol datagram preserves the semantics of the underlying transport—the application does not suffer from the delays associated with stream protocols.

The DTLS connection can include a request to setup a secure connection and can include the port number and information about the multiplexer as a default gateway. Within the secure connection port multiplexer, the incoming port and the outgoing port for that specific connection type can be defined in a configuration file. For example, each incoming secure video session port can be tied to a specific outgoing port. The multiplexer can forward the secure data stream connection request to the predefined outgoing port, which then can be transmitted to the final destination. Once the DTLS signaling is setup, a secure real-time traffic protocol connection (e.g., Web Real-Time Connection "WebRTC") can be initiated from the originating to designated port.

It is to be appreciated that while reference is made in FIG. 2 to a mobile network, in other embodiments, other networks are possible. For instance, the intermediary network (mobile network 204 in FIG. 2) can be a WIFI network, or another wired or wireless computing network. For instance, mobile network 204 in some embodiments can be an intranet of a hospital or other defined space, and user equipment 202 and 208 can be devices within the hospital capable of real-time communications. It is also to be appreciated that while in FIG. 2, user equipment 202 is described as maintaining two segregated secure connections with secured data collector 206 and 208, in other embodiments, user equipment 202 can establish secure communications with one, or three or more devices.

Figure 3:
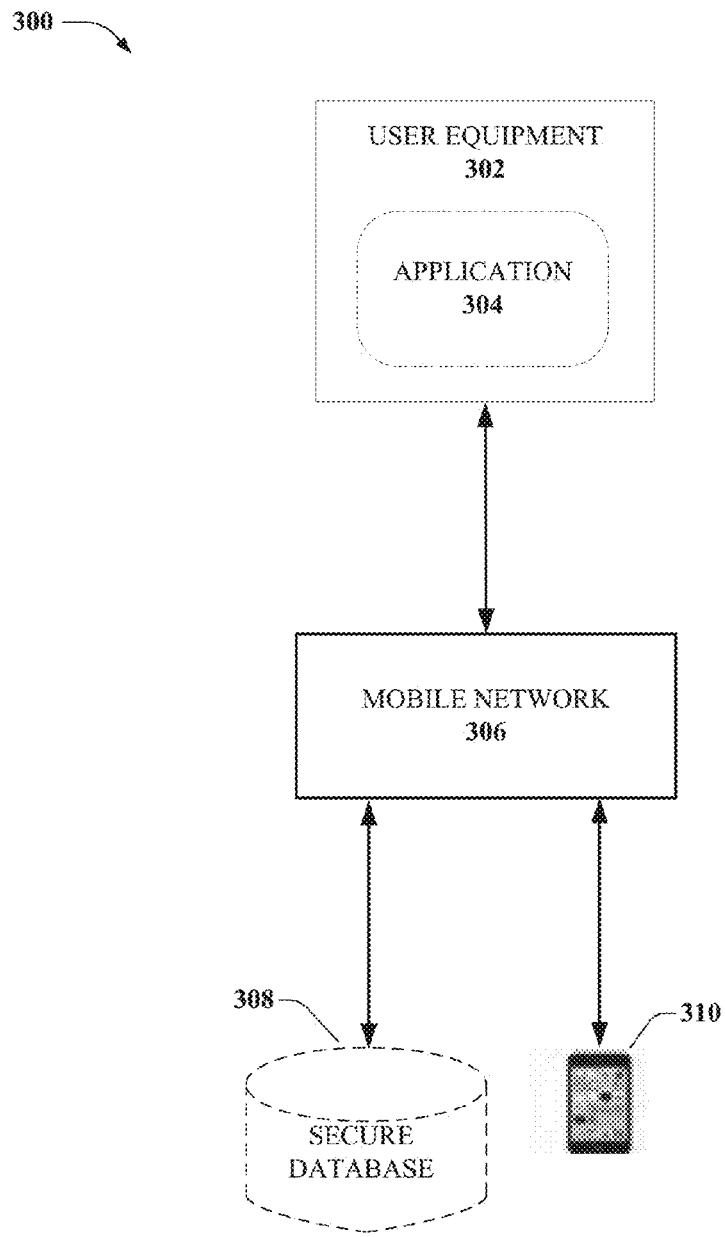
FIG. 3 is an example, non-limiting embodiment of a block diagram showing a network that can support dynamic segregated secure data connections in accordance with various aspects described herein.

Turning now to FIG. 3, illustrated is an example, non-limiting embodiment of a block diagram 300 showing a network that can support dynamic segregated secure data connections in accordance with various aspects described herein A mobile network 306 generally comprises a radio access network that facilitates communications between the devices 302 and 310 and the secure database 308. In an embodiment, device 308 can be a database that is a secured that stores private data collected by one or more sensory devices on user equipment/device 302 and is received via application 304.

In an embodiment, mobile network 306 can be in communication with a mobile device or other user equipment 302. In some embodiments, the user equipment 302 can be a mobile device, tablet, laptop, or desktop computer, or any other computing device. An active session that the user equipment 302 has with the mobile network 306 can have one or more data streams depending on which applications are active on the user equipment 302. For instance, application 304 on user equipment 202 can simultaneously communicate with secure database 308 and device 310 via mobile network 306, while user equipment 302 has a single active session with mobile network 306. In an embodiment, the data streams can be both segregated and secure data connections between each of application 304 and secure database 308 and application 304 and device 310.

In an embodiment, the mobile network 306 can receive a first data stream from application 304 on user equipment 302 and also receive a second data stream from application 304, where both data streams are received via an active packet data protocol context session between the mobile network 306 and the user equipment 302. Each of the data streams can be directed at specific ports, and a multiplexer in the mobile network 306 can use port forwarding to send the data streams to secure database 308 and device 310 via corresponding ports that can be predefined. In an embodiment, the data streams can come from a single application (e.g., application 304) on the user device 302 and be associated with different services of the application 304. In other embodiments, the data streams can come from different applications on the device.

In an embodiment, the application 304 on the user equipment 302 can embed port information into the data streams to direct the data streams to incoming ports in the mobile network 306. In other embodiments, mobile network 306 can determine which incoming ports in the mobile network 306 to direct the data streams to based on the content of the data streams or which services the data streams are associated with. In an embodiment, a first data stream can be associated with secure and/or private data originating from a sensor device on the user equipment 302, while the other data stream can be associated with a video session, chat session, or other data transfer connection associated with application 304.

In an embodiment, the secure connections can be setup by the mobile network 306 via a datagram transport layer security connection (DTLS) that allows datagram-based applications to communicate in a way that is designed to prevent eavesdropping, tampering, or message forgery. The DTLS protocol can be based on the stream-oriented Transport Layer Security (TLS) protocol and is intended to provide similar security guarantees. The DTLS protocol datagram preserves the semantics of the underlying transport—the application does not suffer from the delays associated with stream protocols.

Figure 4:
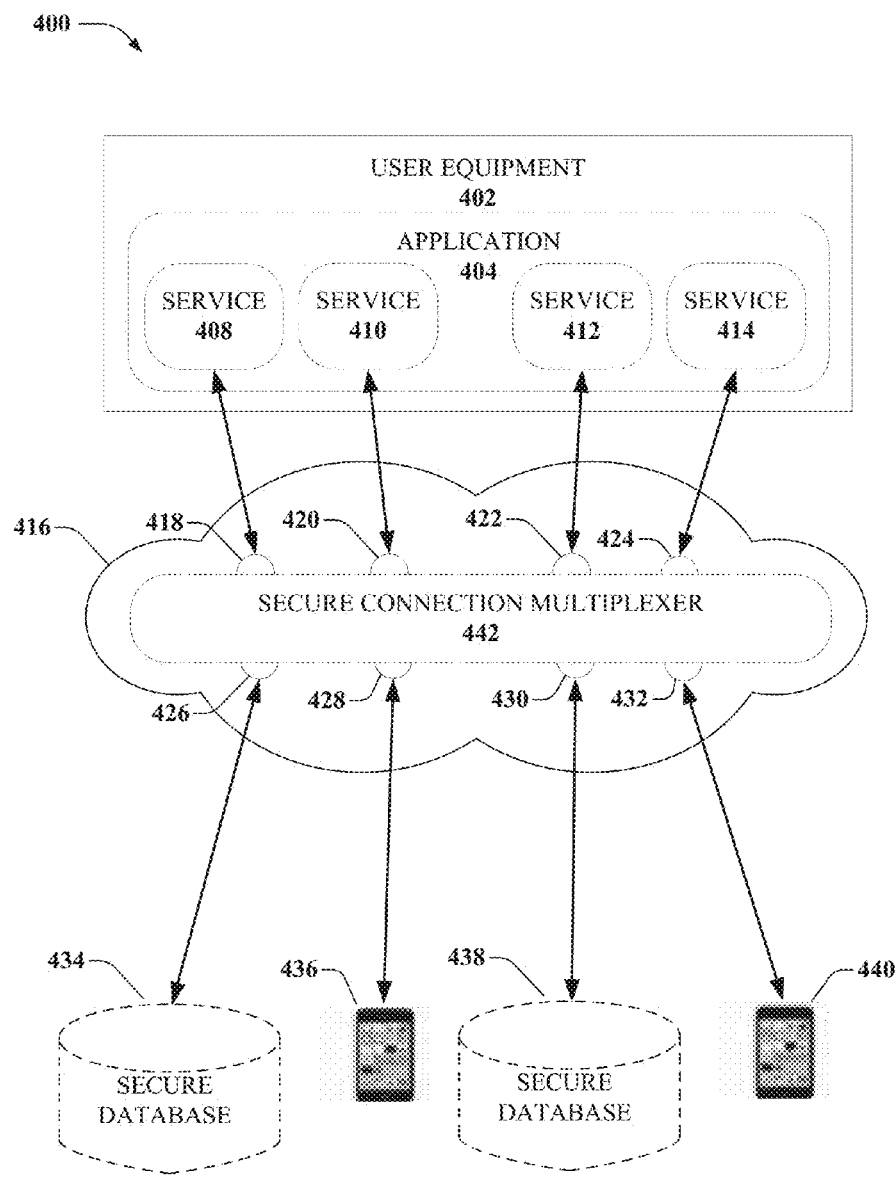
FIG. 4 is an example, non-limiting embodiment of a block diagram showing a network that can support dynamic segregated secure data connections in accordance with various aspects described herein.

Turning now to FIG. 4 illustrated is an example, non-limiting embodiment of a block diagram 400 showing a network that can support dynamic segregated secure data connections in accordance with various aspects described herein.

In an embodiment, mobile network 416 can be in communication with a mobile device or other user equipment 402. In some embodiments, the user equipment 402 can be a mobile device, tablet, laptop, or desktop computer, or any other computing device. An active session that the user equipment 402 has with the mobile network 416 can have one or more data streams depending on which applications are active on the user equipment 402. For instance, application 404 on user equipment 402 can simultaneously communicate with secure databases 434 and 438 and devices 436 and 440 via mobile network 416, while user equipment 402 has a single active session with mobile network 416. In an embodiment, the data streams can be both segregated and secure data connections between each of the services 408, 410, 412, and 414 within application 404 on user equipment 402.

In an embodiment, the mobile network 416 can respectively receive data streams from services 408, 410, 412, and 414 at incoming ports 418, 420, 422, and 424. Each of the data streams can be directed at these specific ports, and secure connection multiplexer 442 in the mobile network 416 can use port forwarding to send the data streams to secure databases 434 and 438 via ports 426 and 430 respectively and to devices 436 and 440 via ports 428 and 432 respectively. In an embodiment, the data streams can come from a single application (e.g., application 404) on the user device 302 and be associated with different services (e.g., services 408, 410, 412, and 414) of the application 402. In other embodiments, the data streams can come from different applications on the device.

In an embodiment, the application 404 and or services 408, 410, 412, and 414 on the user equipment 402 can embed port information into the data streams to direct the data streams to incoming ports 418, 420, 422, and 424 in the secure connection multiplexer 442. In other embodiments, mobile network 416 can determine which incoming ports in the multiplexer 442 to direct the data streams to based on the content of the data streams or which services the data streams are associated with.

Figure 5:
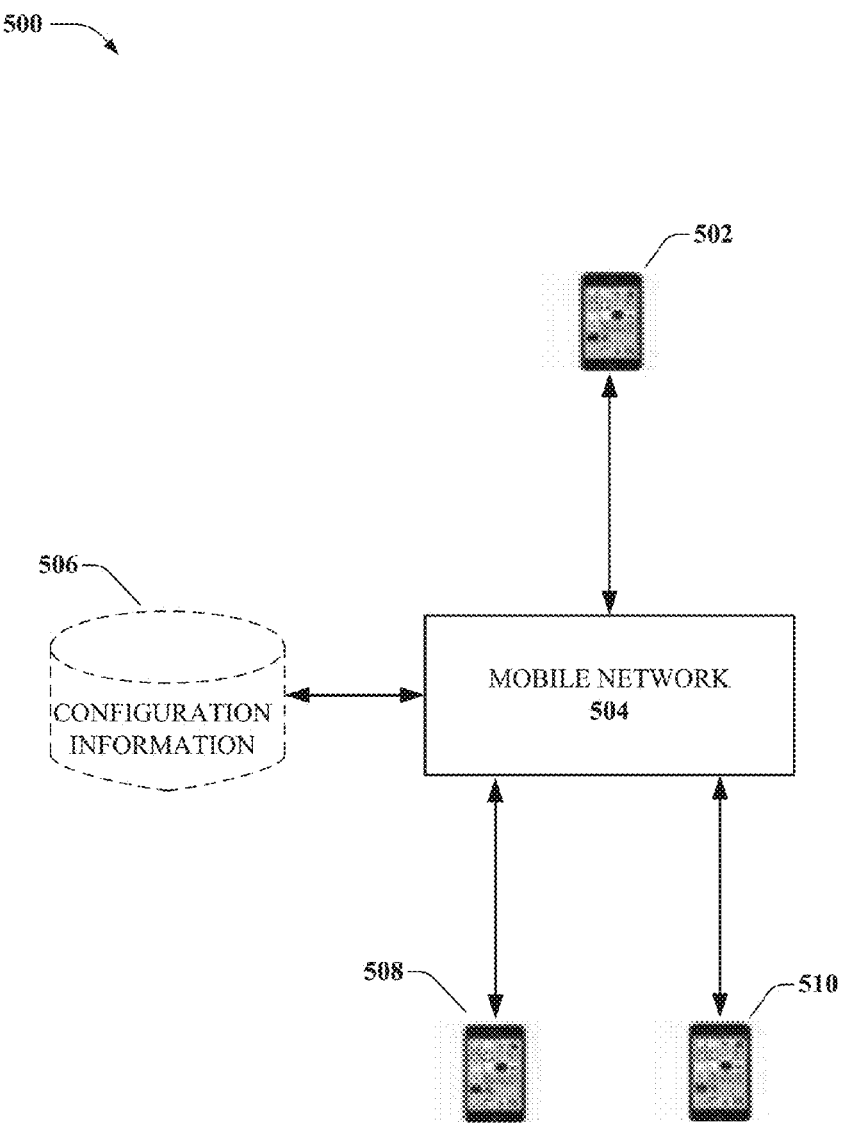
FIG. 5 is an example, non-limiting embodiment of a block diagram showing a network that can support dynamic segregated secure data connections in accordance with various aspects described herein.

Turning now to FIG. 5, illustrated is an example, non-limiting embodiment of a block diagram 500 showing a network that can support dynamic segregated secure data connections in accordance with various aspects described herein In an embodiment, mobile network 504 can be in communication with a mobile device or other user equipment 502. In some embodiments, the user equipment 502 can be a mobile device, tablet, laptop, or desktop computer, or any other computing device. An active session that the user equipment 502 has with the mobile network 504 can have one or more data streams depending on which applications are active on the user equipment 502. For instance, an application on user equipment 502 can simultaneously communicate with user equipment 508 and 510 via mobile network 504, while user equipment 502 has a single active session with mobile network 504. In an embodiment, the data streams can be both segregated and secure data connections between each of user equipment 502 and 508 and 502 and 510.

In an embodiment, the application on the user equipment 502 can embed port information into the data streams to direct the data streams to incoming ports in the mobile network 504. In other embodiments, mobile network 504 can determine which incoming ports in the mobile network 504 to direct the data streams to based on the content of the data streams or which services the data streams are associated with. In an embodiment, a first data stream can be associated with secure and/or private data originating from a sensor device on the user equipment 502, while the other data stream can be associated with a video session, chat session, or other data transfer connection, real-time or not real-time connection. In an embodiment, a database comprising configuration information 506 can be utilized to facilitate port forwarding from the incoming ports to the outgoing ports in the mobile network 504. The configuration information 506 can also retain information identifying which services in the application on mobile device 502 are associated with specific incoming ports in the mobile network 504.

Figure 6:
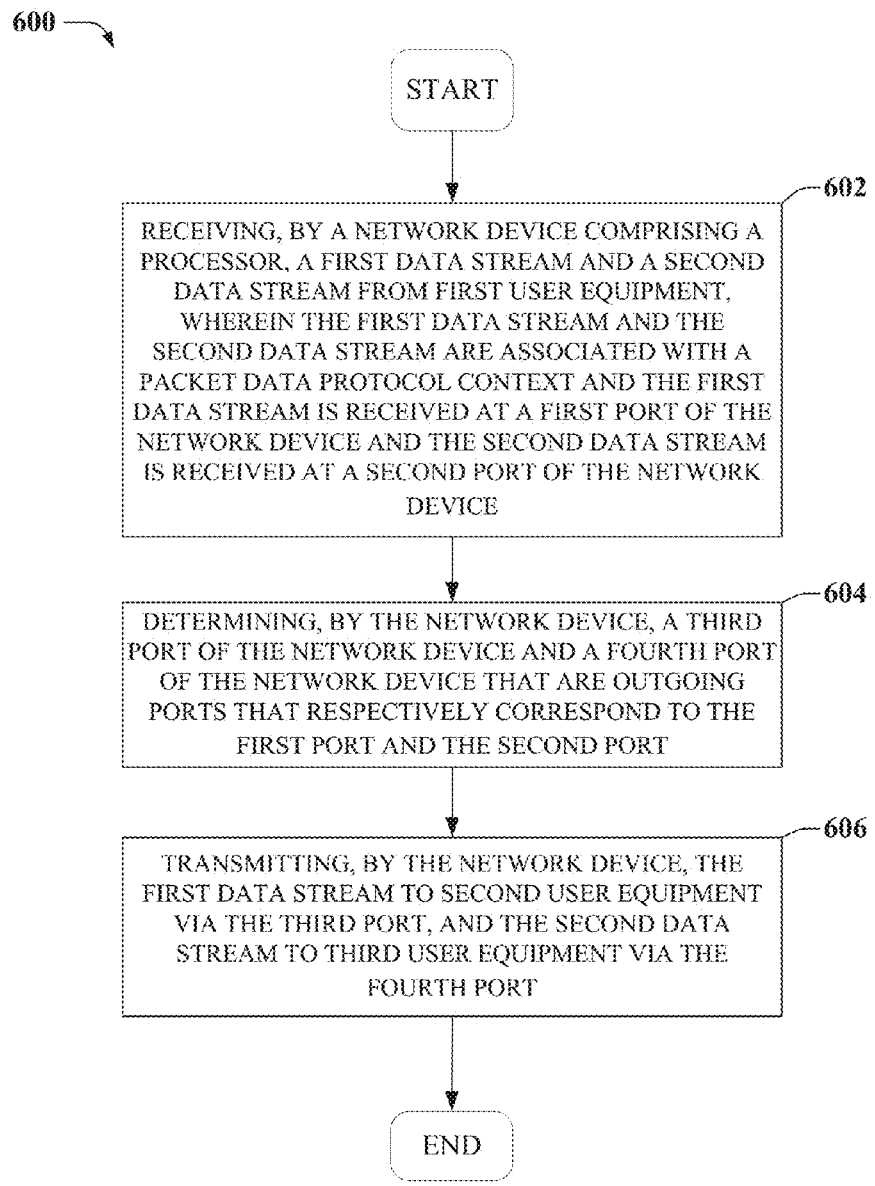
FIG. 6 illustrates a flow diagram of an example, non-limiting embodiment of a method for providing dynamic segregated secure data connections as described herein.
Figure 7:
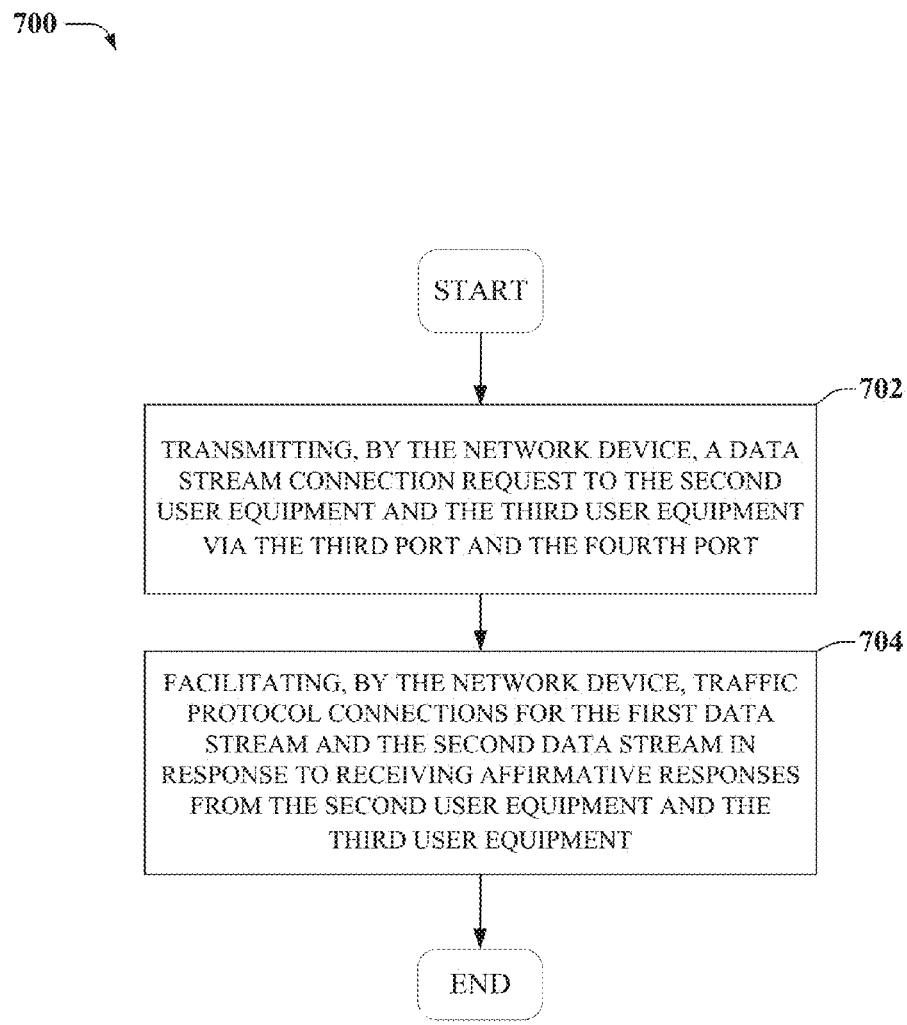
FIG. 7 illustrates a flow diagram of an example, non-limiting embodiment of a method for providing dynamic segregated secure data connections as described herein.

FIGS. 6-7 illustrates a process in connection with the aforementioned systems. The processes in FIGS. 6-7 can be implemented for example by the systems in FIGS. 1-5. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates a flow diagram of an example, non-limiting embodiment of a method 600 for providing dynamic segregated secure data connections as described herein.

Method 600 can begin at 602 where the method includes receiving, by a network device comprising a processor, a first data stream and a second data stream from first user equipment, wherein the first data stream and the second data stream are associated with a packet data protocol context and the first data stream is received at a first port of the network device and the second data stream is received at a second port of the network device. At 604, the method includes determining, by the network device, a third port of the network device and a fourth port of the network device that are outgoing ports that respectively correspond to the first port and the second port. At 606, the method can include transmitting, by the network device, the first data stream to second user equipment via the third port, and the second data stream to third user equipment via the fourth port.

Turning now to FIG. 7, illustrates a flow diagram of an example, non-limiting embodiment of a method 700 for providing dynamic segregated secure data connections as described herein.

At 702, the method can include transmitting, by the network device, a data stream connection request to the second user equipment and the third user equipment via the third port and the fourth port. At 704, the method can include facilitating, by the network device, traffic protocol connections for the first data stream and the second data stream in response to receiving affirmative responses from the second user equipment and the third user equipment.

Figure 8:
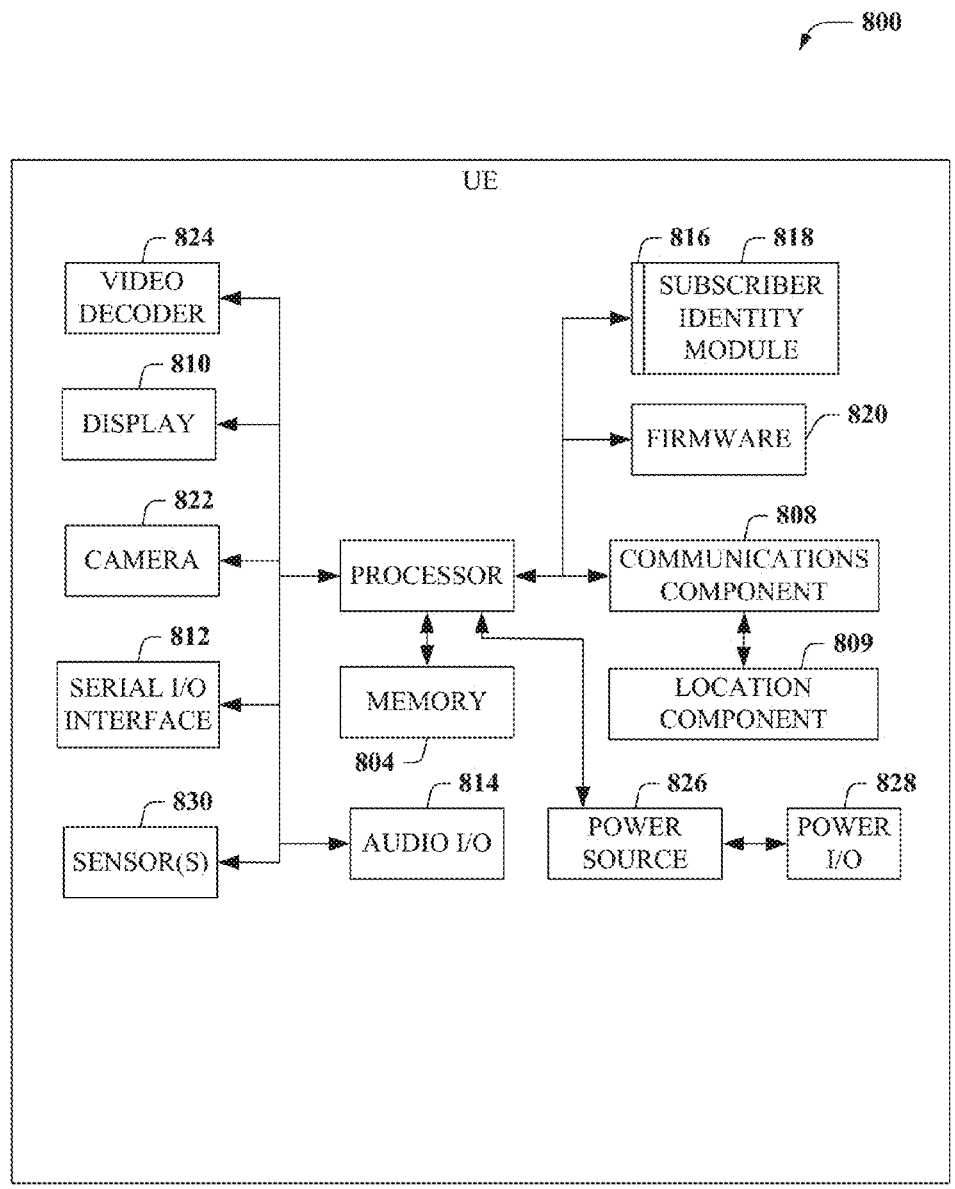
FIG. 8 is a block diagram of an example, non-limiting embodiment of a user equipment in accordance with various aspects described herein.

Referring now to FIG. 8, there is illustrated a block diagram of a UE 800 in accordance with the innovation. The UE 800 can include a processor 802 for controlling all onboard operations and processes. A memory 804 can interface to the processor 802 for storage of data and one or more applications 806 being executed by the processor 802. A communications component 808 can interface to the processor 802 to facilitate wired/wireless communication with external systems (e.g., femtocell and macro cell). The communications component 808 interfaces to a location component 809 (e.g., GPS transceiver) that can facilitate location detection of the UE 800. Note that the location component 809 can also be included as part of the communications component 808.

The UE 800 can include a display 810 for displaying content downloaded and/or for displaying text information related to operating and using the device features. A serial I/O interface 812 is provided in communication with the processor 802 to facilitate serial communication (e.g., USB, and/or IEEE 1394) via a hardwire connection. Audio capabilities are provided with an audio I/O component 814, which can include a speaker for the output of audio signals related to, for example, recorded data or telephony voice data, and a microphone for inputting voice signals for recording and/or telephone conversations. In addition, sensor(s) 830 can be included to detect usage activity of the UE 800 and/or to detect position, motion and/or orientation of the UE 800.

The UE 800 can include a slot interface 816 for accommodating a subscriber identity module (SIM) 818. Firmware 820 is also provided to store and provide to the processor 802 startup and operational data. The UE 800 can also include an image capture component 822 such as a camera and/or a video decoder 824 for decoding encoded multimedia content. The UE 800 can also include a power source 826 in the form of batteries, which interfaces to an external power system or charging equipment via a power I/O component 828. In addition, the UE 800 can be substantially similar to and include functionality associated with mobile devices 102, 106, and 108 described in FIG. 1 as well as the other user equipment described in FIGS. 2-5.

Figure 9:
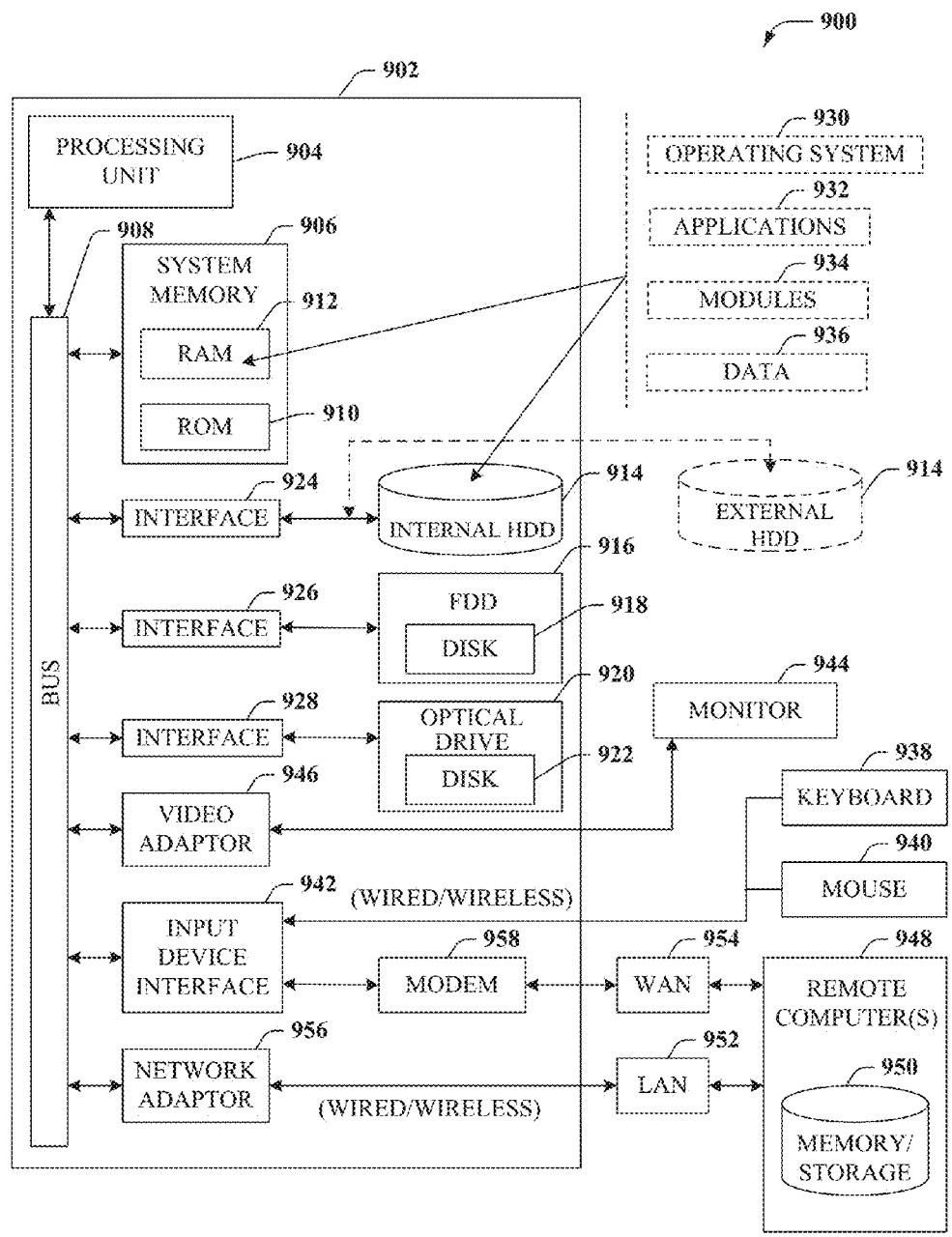
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the mobile network or multiplexer disclosed in any of the previous systems 100, 200, 300, 400, and/or 500.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 9, the example environment 900 for implementing various embodiments of the aspects described herein comprises a computer 902, the computer 902 comprising a processing unit 904, a system memory 906 and a system bus 908. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, comprising an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can comprise a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically comprises other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN)

952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also comprise a wireless AP disposed thereon for communicating with the wireless adapter 956.

When used in a WAN networking environment, the computer 902 can comprise a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

In an embodiment of the subject application, the computer 1002 can provide the environment and/or setting in which one or more of the dynamic secure mobile network systems disclosed in FIGS. 1-6 can be operated from.

Figure 10:
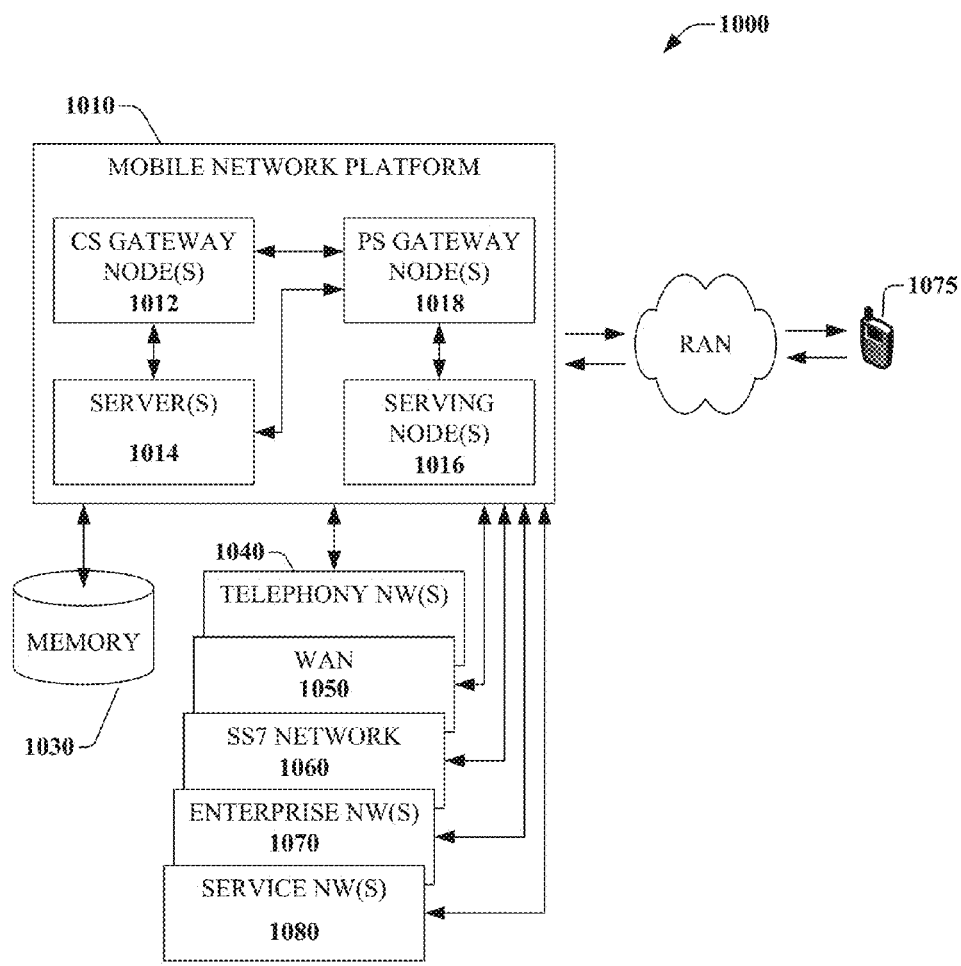
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 comprises CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication. Mobile network platform 1010 can also comprise the MMEs, HSS/PCRFs, SGWs, and PGWs disclosed herein.

In addition to receiving and processing CS-switched traffic and signaling, PS gateway node(s) 1018 can authorize and authenticate PS-based data sessions with served mobile devices. Data sessions can comprise traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also comprises serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can comprise one or more processors configured to confer at least in part the functionality of macro network platform 1010. To that end, the one or more processor can execute code instructions stored in memory 1030, for example. It is should be appreciated that server(s) 1014 can comprise a content manager 1015, which operates in substantially the same manner as described hereinbefore.

In example embodiment 1000, memory 1030 can store information related to operation of wireless network platform 1010. Other operational information can comprise provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIGS. 9 and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, field programmable gate array, graphics processor, or software defined radio reconfigurable processor and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving a first data stream from a first device, wherein the first data stream is associated with an active session between the first device and a mobile network and wherein the first data stream is associated with a first incoming port;
receiving a second data stream from the first device, wherein the second data stream is associated with the active session, wherein the second data stream is associated with a second incoming port, and wherein the first data stream and the second data stream are received concurrently;
determining, based on an indicator in the first data stream, that the first data stream corresponds to a first connection type associated with personal healthcare information, and the second data stream corresponds to a second connection type;
determining a third port and a fourth port that are outgoing ports that respectively correspond to the first and second ports based on a configuration file that indicates the outgoing ports for respective connection types;
transmitting the first data stream to a second device via the third port; and
transmitting the second data stream to a third device via the fourth port.

2. The system of claim 1, wherein the first data stream and the second data stream are associated with a first application executed by the first device.

3. The system of claim 1, wherein the first data stream is associated with a first application executed by the first device and the second data stream is associated with a second application executed by the first device that is different from the first application.

4. The system of claim 1, wherein the first data stream and the second data stream are received via a secure connection, wherein the secure connection utilizes a transport layer security protocol.

5. The system of claim 1, wherein the operations further comprise:
sending a data stream connection request to the second device and to the third device via the third port and the fourth port.

6. The system of claim 5, wherein the operations further comprise:
establishing traffic protocol connections for the first data stream and the second data stream in response to receiving affirmative responses to the data stream connection request from the second device and the third device.

7. The system of claim 1, wherein the operations further comprise:
determining the first incoming port and the second incoming port based on an application associated with the first data stream and the second data stream.

8. The system of claim 1, wherein the operations further comprise:
determining the first incoming port and the second incoming port based on a type of content of the first data stream or the second data stream.

9. The system of claim 1, wherein the second device is selected based on the third port and the third device is selected based on the fourth port.

10. A method, comprising:
receiving, by a network device comprising a processor, a first data stream and a second data stream concurrently from first user equipment, wherein the first data stream and the second data stream are associated with a packet data protocol context and the first data stream is received at a first port of the network device and the second data stream is received at a second port of the network device;
determining, by the network device, based on an indicator in the first data stream, that the first data stream corresponds to a first connection type associated with personal healthcare information, and the second data stream corresponds to a second connection type different than the first connection type;
determining, by the network device, a third port of the network device and a fourth port of the network device that are outgoing ports that respectively correspond to the first port and the second port based on a configuration file that indicates the outgoing ports for respective connection types; and
transmitting, by the network device, the first data stream to second user equipment via the third port, and the second data stream to third user equipment via the fourth port.

11. The method of claim 10, wherein the first data stream and the second data stream are associated with a first application executed by the first user equipment.

12. The method of claim 10, wherein the first data stream is associated with a first application of the first user equipment and the second data stream is associated with a second application of the first user equipment.

13. The method of claim 10, further comprising:
transmitting, by the network device, data stream connection requests to the second user equipment and the third user equipment via the third port and the fourth port.

14. The method of claim 13, further comprising:
facilitating, by the network device, traffic protocol connections for the first data stream and the second data stream in response to receiving affirmative responses to the data stream connection requests from the second user equipment and the third user equipment.

15. The method of claim 10, further comprising:
determining, by the network device, the first port and the second port based on an application associated with the first data stream and the second data stream.

16. The method of claim 10, further comprising:
determining, by the network device, the first incoming port and the second incoming port based on a first type of content of the first data stream or a second type of content of the second data stream.

17. The method of claim 10, wherein the first data stream is associated with a first service provided by an application and the second data stream is associated with a second service provided by the application.

18. A non-transitory machine-readable storage medium, comprising executable instructions that, when executed by a processor, facilitate performance of operations, comprising:
- receiving a first data stream and a second data stream simultaneously from a first user equipment, wherein the first data stream and the second data stream are associated with a packet data protocol context and the first data stream is received at a first port and the second data stream is received at a second port;
- determining, based on an indicator in the first data stream, that the first data stream corresponds to a first connection type associated with electronic personal healthcare information, and the second data stream corresponds to a second connection type;
- determining a third port and a fourth port that are outgoing ports that respectively correspond to the first port and the second port based on a configuration file that indicates the outgoing ports for respective connection types; and
- transmitting the first data stream to a second user equipment via the third port, and the second data stream to a third user equipment via the fourth port.

19. The non-transitory machine-readable storage medium of claim 18, wherein the operations further comprise:
- transmitting a data stream connection request to the second user equipment and the third user equipment via the third port and the fourth port; and
- facilitating traffic protocol connections for the first data stream and the second data stream in response to receiving affirmative responses from the second user equipment and the third user equipment.

20. non-transitory The machine-readable storage medium of claim 18, wherein the operations further comprise:
- determining the first port and the second port based on an application associated with the first data stream and the second data stream.

* * * * *